United States Patent
Tomisaka

[19]

[11] Patent Number: 6,079,228
[45] Date of Patent: Jun. 27, 2000

[54] FORMING METHOD OF GLASS ELEMENT

[75] Inventor: Toshiya Tomisaka, Yao, Japan

[73] Assignee: Minolta Co., Ltd., Osaka, Japan

[21] Appl. No.: 09/122,546

[22] Filed: Jul. 24, 1998

[30] Foreign Application Priority Data

Jul. 25, 1997 [JP] Japan .................................. 9-199825
Jul. 25, 1997 [JP] Japan .................................. 9-199826

[51] Int. Cl.$^7$ .................................................. C03B 11/05
[52] U.S. Cl. ............................ 65/102; 65/37; 65/39; 65/318; 65/404
[58] Field of Search .............................. 65/37, 39, 102, 65/305, 318, 319, 322, 404

[56] References Cited

FOREIGN PATENT DOCUMENTS

| | | |
|---|---|---|
| 61-251529 | 11/1986 | Japan . |
| 4-170328 | 6/1992 | Japan . |
| 4-219329 | 8/1992 | Japan . |
| 5-339013 | 12/1993 | Japan . |
| 9-90151 | 4/1997 | Japan . |

*Primary Examiner*—Stanley S. Silverman
*Assistant Examiner*—Michael P. Colaianni
*Attorney, Agent, or Firm*—McDermott, Will & Emery

[57] ABSTRACT

A method of molding a glass element in which a glass material is heated and then press-molded between an upper mold and a lower mold when a temperature of the heated glass material reaches a predetermined temperature. A first cooling of the glass element is performed with the glass element in contact with the pair of molds until a temperature of the glass element is within a range of ±20° C. of a glass transition point of the glass material while a pressure applied to the glass element by the upper and lower molds is gradually reduced until the pressure becomes 0 kg/cm$^2$. Subsequently, a second cooling of the glass element is performed without the upper and lower molds contacting the patterned surface on the glass element. The upper mold has a bottom surface and a sidewall surface with a lowermost end portion of the side wall surface, adjacent the bottom surface, being inclined with respect to a central axis of the upper mold.

13 Claims, 6 Drawing Sheets

FIG. 3(a)
FIG. 3(b)
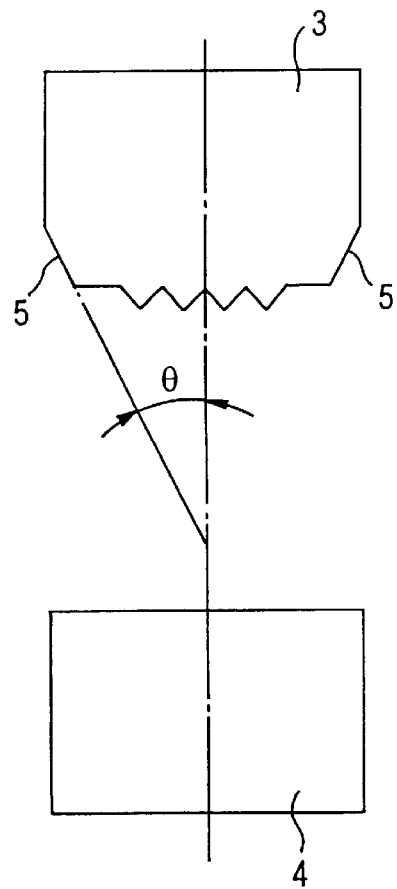
FIG. 3(c)
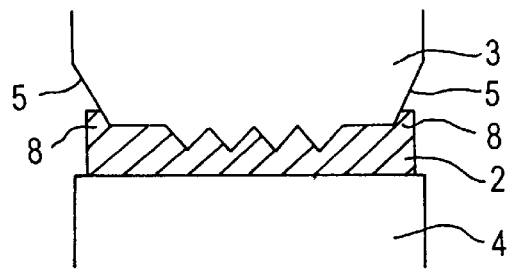

FIG. 7(a)(1)
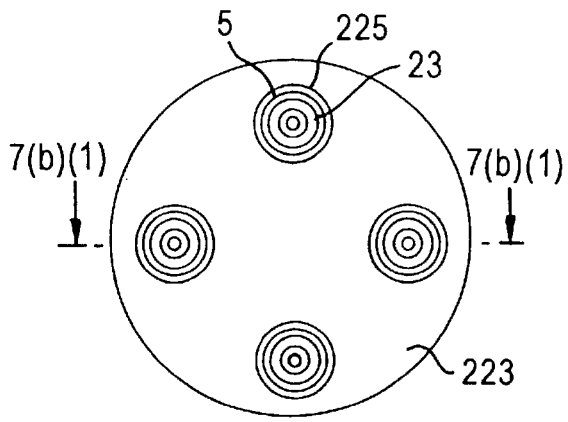
FIG. 7(b)(1)
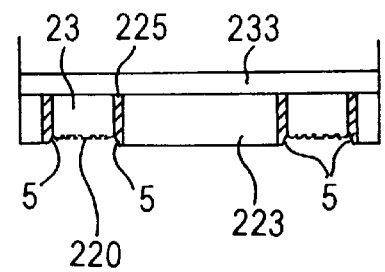
FIG. 7(a)(2)
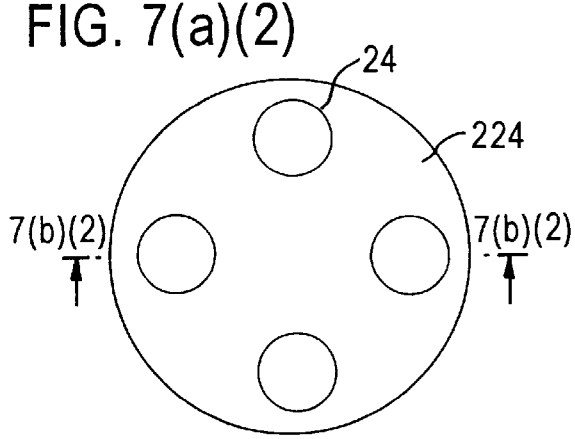
FIG. 7(b)(2)
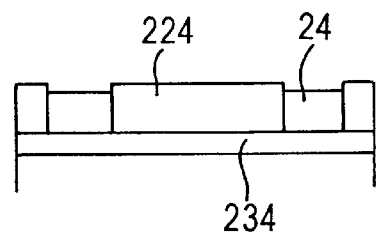
FIG. 7(c)
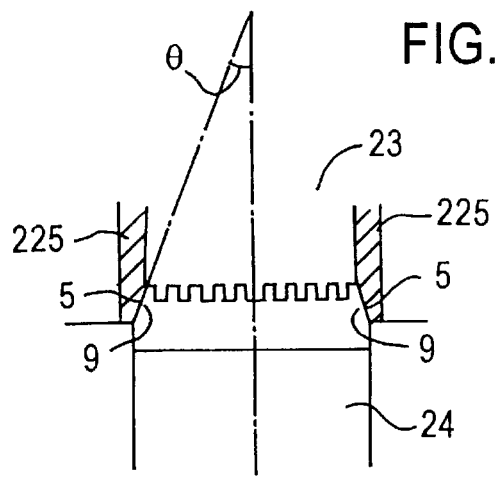

FORMING METHOD OF GLASS ELEMENT

This application is based on Application No. 9-146536 filed in Japan, the contents of which are hereby incorporated by reference.

FIELD OF THE INVENTION

The present invention relates to a method of forming, by press molding, patterned elements such as lenses, prisms and gratings, namely, substrates and optical elements having on their surfaces extremely fine patterns with a spacing of 0.1 $\mu$m to 1000 $\mu$m, and more particularly, to a reheat press method in which a glass preform, previously processed into a predetermined configuration, is heated and then pressure-molded with molds.

DESCRIPTION OF THE RELATED ART

In recent years, patterned elements, namely, substrates and optical elements having on their surfaces extremely fine patterns with a spacing of 0.1 $\mu$m to 1000 $\mu$m have been frequently used in optical systems and high-precision positioning devices. While some of these patterned elements have been formed by plastic molding, recently, a demand for elements made of glass materials has been rapidly increasing. This is because glass materials are superior to plastic materials in thermal expansion coefficient and refractive index, and are advantageous in positioning and design freedom. For this reason, examinations have been made as to a method of inexpensively mass-producing glass-made patterned elements with high precision.

The most promising method of forming patterned elements is a so-called press molding process in which a preform, previously processed into a configuration approximate to the configuration of a desired optical element, is heated to be softened, and pressure-molded between the molds.

In a typical press molding process of a glass element having no patterns, first, a lump of glass is processed into a predetermined configuration to form a glass preform. The glass preform is conveyed to a space between the molds and heated. When the temperature of the glass preform reaches a molding temperature, the molds are pressurized to start press molding. After a predetermined molding time has elapsed, cooling is performed. Then, mold release is performed to take out the molded element. It is common practice to perform cooling with the molds pressurized. This is done in order to control cooling so that the glass is cooled at a predetermined speed by maintaining contact between the molded element and the molds. Continuing pressurization of the molds during cooling until the temperature of the glass decreases restricts the glass from flowing and thus, thermally deforming the transferred configuration. Consequently, the configuration of the molding surfaces of the molds can be precisely transferred.

A problem of the press molding process is fusing resulting between a mirror surface of the molded glass element and the molds. However, this problem can be prevented by using a mold material and a glass material having different thermal expansion coefficients. Since the abutting areas of both the molded glass element on the molds are surfaces, there is only a little resistance resulting when they shrink according to their inherent thermal expansion coefficients. For this reason, the above-mentioned problem is not apt to arise. This problem can also be avoided by improving slip between the molds and the preform, for example, by coating the surface of one or both of the preform and the molds.

As other means for preventing fusing, the following have been reported: in the pressurized cooling process of the press molding process, the pressure applied to the molded glass element is gradually reduced as cooling proceeds (Japanese Published Patent Application No. H4-35427); cooling is performed with the molded glass element and the molds being in contact with each other, but without pressurization (Japanese Laid-open Patent Application No. H4-170328); and during the cooling process, pressure cooling is performed until the temperature becomes Tg and then, the pressure is rapidly reduced (Japanese Laid-open Patent Applications Nos. H4-219329 and H5-339013).

On the other hand, in the molding of a glass element having patterns, a method is known where desired patterns are formed on the molding surfaces of the molds and the patterns are transferred to the glass. In this case, the problem of fusing also arises as in the case of molding of a glass element having no patterns. In molding of a patterned element, since it is important to precisely transfer the patterns to the glass, it is necessary to perform cooling while continuing pressurization.

However, even if the thermal expansion coefficients of the molds and the glass material are adjusted as in the case of molding of a glass element having no patterns in order to solve the problem of fusing, in the molding (particularly, in the pressure cooling), the molds shrink more quickly than the glass material in the cooling process when the thermal expansion coefficient of the molds is higher than that of the glass. Since the shrinkage of the glass is slow and does not follow the shrinkage of the molds, the shrinkage of the patterns on the molded glass is impeded by convex portions of the molds causing stress. Thus, a new problem arises in that deficiencies, such as chips and fractures, occur at the patterned portion of the molded element. Oppositely, a similar problem arises because the shrinkage of convex portions of the patterns on the glass is impeded by the convex portions of the patterns of the molds.

From the point of view of mold configuration, an upper mold comprising a core 23 and a cylindrical outer mold 225' as shown in FIG. 11(b) has conventionally been used. Since the lowest end portion (the area contacting the glass) on the inner surface of the outer mold 225' is vertical to the upper surface of a lower mold, the side surfaces of the molded glass element are constricted by shrinkage of the outer mold 225', so that the problem of chips, fractures and cracks arises also at the side surfaces. In the case of a conventionally-used upper mold 3' as shown in FIG. 11(a), since the lowest end portion (the area contacting the glass) on the outer surface of the upper mold 3' is vertical to the upper surface of the lower mold, the glass flowing out of the transfer diameter of the mold shrinks more quickly than the mold, so that the molds are constricted from outside. As a result of the stress affecting the transferred surface, distortion results also on the transferred surface and the problem of chips, fractures and cracks arises.

In particular, when extremely fine patterns having a spacing of 0.1 $\mu$m to 1000 $\mu$m are formed, the above-mentioned problem of chips, etc. is serious unless the thermal expansion coefficients of the glass material and the closely approximate each other. However, when a combination of a glass material and molds which have a small thermal expansion coefficient difference is adopted, since the glass material and the molds shrink at an equal speed with the patterns thereof being engaged with each other, the problem of fusing again arises and mold release cannot be successfully performed. Since concave and convex portions of the molds and the preform are engaged with each other, the effect of slip cannot be expected in molding of a molded glass element. For these reasons, in molding of a patterned element, it is quite difficult to prevent fusing by adjusting the thermal coefficients or by improving slip.

When the above-described means to improve the cooling process is applied to the press molding process of a molded glass element having patterns, as disclosed in Japanese Published Patent Application No. H4-35427 and Japanese Laid-open Patent Application No. H4-170328, since the molds continuously contact with the molded glass element even after the temperature becomes less than Tg where the fluidity of the glass is low, the above-mentioned problem of chips and fractures due to shrinkage of the molded glass element and the molds are serious. According to Japanese Laid-open Patent Applications Nos. H4-219329 and H5-339013, since the pressure is rapidly reduced in the vicinity of Tg, the patterned portion of the molded glass element which has not completely set adheres to the spacing between the patterns of the molds when the molds are separated from the molded glass element, so that fusing and fractures, etc. result.

As for the press molding process of a molded glass element having patterns, Japanese Laid-open Patent Application No. H9-90151 teaches that the press molding temperature is preferably in the vicinity of Tg in view of the shrinkage of the glass. However, there is no description as to the cooling process in this prior art. Thus, at present, the above-mentioned problems have yet to be solved

SUMMARY OF THE INVENTION

An object of the present invention is to provide a molding method of a glass element in which the above-mentioned problems are solved.

Another object of the present invention is to provide a molding method of a glass element in which fusing between the glass material and the molds does not result even when the molded glass element has patterns.

A yet another object of the present invention is to provide a molding method of a glass element in which the above-mentioned problem of chips, fractures and cracks does not result in the molded glass element even when the molded glass element has patterns.

To achieve the above-mentioned objects, the molding method of a glass element of the present invention comprises:

heating a glass material and when its temperature reaches a predetermined temperature, press-molding it between a pair of molds;

cooling the molds until a temperature thereof becomes within a range of ±20° C. with respect to a glass transition point of the glass material while gradually reducing a pressure applied to a molded glass element until said pressure becomes 0 kg/cm$^2$; and subsequently, cooling the molded glass element with the molds and a patterned surface of the molded glass element not being in contact with each other.

Another aspect of the present invention comprises:

heating a glass material and when its temperature reaches a predetermined temperature, press-molding it between a pair of molds, an upper mold of the pair of molds having an inclined surface at its lowest end portion; and cooling the glass material between the molds.

The invention itself, together with further objects and attendant advantages, will be understood by reference to the following detailed description taken in conjunction with the accompanies drawings.

BRIEF DESCRIPTION OF THE DRAWINGS

FIG. 3(a) is a schematic bottom view of an upper mold used in the first embodiment;

FIG. 3(b) is a schematic cross-sectional structure view of the upper and lower molds (a schematic cross-sectional view taken on the line A—A of FIG. 3(a) with respect to the upper mold);

FIG. 3(c) is a schematic cross-sectional view showing the preform being pressure-molded with the molds;

FIG. 7(a)(1) is a schematic bottom view of an upper mold and FIG. 7(a)(2) is a schematic top view of a lower mold used in the second embodiment;

FIG. 7(b)(1) is a schematic cross-sectional structure view of the upper mold taken on the line B—B of FIG. 7(a)(1) and FIG. 7(b)(2) is a cross-sectional structure view of the lower mold taken on the line C—C of FIG. 7(a)(2);

FIG. 7(c) is a schematic cross-sectional view showing the preform being pressure-molded with a pair of molds;

In the following description, like parts are designed by like reference numbers throughout the several drawings.

DETAILED DESCRIPTION OF THE PREFERRED EMBODIMENTS

Figure 1:
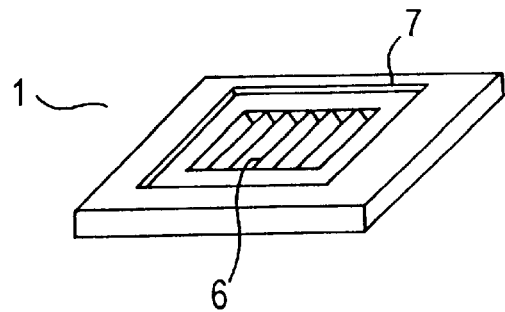
FIG. 1 is a perspective view of a molded glass element formed in a first embodiment.

Hereinafter, the present invention will be described by use of embodiments with reference to the drawings.

While the present invention will hereinafter be described with respect to a case where a molded glass element has patterns, it is obvious to those skilled in the art that the present invention is not limited thereto and that the method of the present invention delivers its effects also in a case where a molded glass element has no patterns.

Specifically, when the thermal expansion coefficient of the mold material is lower than that of the glass material, an upper mold 3 has an inclined surface 5 at the lowest end portion on the outer surface as shown in FIG. 3(b). When the thermal expansion coefficient of the mold material is higher than that of the glass material, the upper mold comprises a core 23 and an outer mold 225 and has the inclined surface 5 at the lowest end portion on the inner surface of the outer mold as shown in FIG. 7(b) or 7(c). When the inclination angle θ (θ<90°) between the inclined surface 5 and the central axis of the molds is not less than 3°, an effect of the present invention is realized, that is, mold release of the molded glass element from the molds is promoted and the problems of fusing, chips, fractures and cracks are prevented. Preferably, the inclination angle θ is 10 to 60°. This is because the above-mentioned effect of the present invention is not easily realized when the angle θ is less than 10°, and more than 60° and the effects of the present invention are easily realized when the angle θ falls within the above-mentioned range. More desirably, the range of the angle θ is 15 to 50° when the upper mold has a structure as shown in FIG. 3(b), and 10 to 45° when the upper mold has a structure as shown in FIG. 7(c).

The preform is press-molded in accordance with conventional press conditions with a conventional press-molding machine having a patterned portion. The upper mold of the press-molding machine used in the method of the present invention has a patterned portion in order to transfer patterns to the molded glass element. The concave and convex portions of the pattern may be of any configuration that can be transferred by press molding. Examples of the configuration include one having a triangular cross section (see FIG. 3(b)), one having a square cross section (see FIG. 7(b)) and one having a semicircular cross section. The overall configuration of the patterned portion when the upper mold having the patterned portion on its bottom surface is viewed from below may be of various configurations such as a linear configuration, a circular configuration in which a plurality of linear patterns are arranged in parallel (see FIG. 3(a)), a circular configuration (see FIG. 7(a)) and a spot configuration. The depth of the concave portions is 0.1 to 300 μm, preferably, 1 to 200 μm.

The surface of the lower mold which comes into contact with the glass material (preform) may be any kind of surface such as a plane surface or a curved surface. Moreover, the surface of the lower mold preferably has a desired surface precision to be transferred to the glass material.

In the present invention, while any glass that has conventionally been used for manufacture of optical elements may be used as the glass material, it is preferable to select glass having a thermal expansion coefficient such that the difference in thermal expansion coefficient between the glass and the subsequently-described mold material falls within a range of $10 \times 10^{-7}$ to $120 \times 10^{-7}/°$ C., preferably, within a range of $25 \times 10^{-7}$ to $60 \times 10^{-7}/°$ C. In the present invention, the glass material is shrunk by cooling to the vicinity of the transition point at a constant speed with the patterns of the glass material and the molds being in contact with each other. For this reason, when the difference in thermal expansion coefficients is smaller than the above-mentioned one, fusing is apt to occur, so that there is a possibility that mold release cannot be smoothly performed in a second cooling process. When the difference in thermal expansion coefficients is greater than the above-mentioned one, the difference in shrinking speed between the glass material and the mold material becomes excessive in cooling, so that distortion is caused in the molded elements. As a result, not only is there a possibility that the precision of the pattern dimension deteriorates, but chips and fractures are also apt to result. Examples of preferred glass include BK7 glass, LaF71 glass, SK5 and heat-resistant glass. In the present invention, such a glass material is cut and ground as in conventional press molding of optical elements, and is used as a preform. While not specifically limited thereto, the thickness of the preform preferably falls within a range of 1 to 5 mm.

In forming a molded glass element by use of a press-molding machine having the above-described upper mold, it is preferable for the upper mold to have an inclined surface at the lowest end portion. Specifically, when the thermal expansion coefficient of the mold material is lower than that of the glass material, it is preferable for the upper mold 3 to have the inclined surface 5 at the lowest end portion on the outer surface as shown in FIG. 3(b). When the thermal expansion coefficient of the mold material is higher than that of the glass material, it is preferable for the upper mold to comprise the core 23 and the outer mold 225 and to have the inclined surface 5 at the lowest end portion on the inner surface of the outer mold as shown in FIG. 7(b) or 7(c). It is desirable that the inclination angle θ (θ<90°) between the inclined surface 5 and the central axis of the molds be not less than 3°, preferably, 10 to 60°. By thus forming the inclined surface, the force for the material having a higher thermal expansion coefficient to constrict the material having a lower thermal expansion coefficient can be relieved in the pressurizing direction because of shrinkage at the time of cooling to thereby promote mold release. Consequently, the portion of the glass which is in contact with the inclined surface (a portion 8 in FIG. 3(c) and a portion 9 in FIG. 7(c)) retracts along the inclined surface of the mold before the glass of the patterned portion is completely set by cooling, so that the molded glass element is smoothly separated from the mold. As a result, the molded glass element is easily formed without any fusing or fractures, etc. at the patterned portion. As for the upper mold used when the thermal expansion coefficient of the mold material is higher than that of the glass material, the materials of the core and the outer mold constituting the upper mold do not necessarily have to be the same as long as the thermal expansion coefficients thereof are higher than that of the glass material. Moreover, the core and the outer mold may be separable or integrated.

In forming a molded glass element having patterns by use of the above-described press-molding machine, first, the preform is conveyed to a space between the upper and lower molds of the molding machine and heated between the molds to a molding temperature. The molding temperature, which differs according to the glass being used, is a temperature at which the glass is softened to an extent that the patterns can be transferred. Appropriate molding temperatures are normally 480 to 750° C.

After the temperature of the preform reaches the molding temperature, the distance between the upper and the lower molds is decreased and the mold is pressurized to start press molding. The press molding is continued for 3 to 10 minutes with the preform temperature being maintained at the molding temperature. The pressure applied to the preform is any pressure that allows the patterns to be transferred, and is normally 15 to 60 kg/cm².

After the press molding is finished, cooling of the molded glass element is started. In a first cooling process, the molded glass element is gradually cooled at a speed of 20 to 40° C./minute, preferably, 25 to 30° C./minute, and cooling is continued for 2 to 5 minutes until a point T is reached where the temperature of the molded glass element is in the vicinity of the transition point. At this time, the pressure applied to the molded glass element is gradually reduced at a speed of 3 to 30 kg/cm²/minute, preferably, 3 to 10 kg/cm²/minute so that the pressure is 0 kg/cm² when the temperature reaches the point T. The point T is not necessarily the transition point of the glass material being used but may be set within a range of ±20° C. of the transition point, preferably, within a range of ±10° C. of the transition point. When the patterns are extremely fine, since it is necessary to precisely transfer the pattern configuration of the mold, the point T is set to a temperature approximately 10° C. lower than the transition point. This is because the glass material is nearly completely set when its temperature reaches this temperature and it is unlikely that the pattern configuration is not precisely transferred.

The reason why the pressure is gradually reduced so as to be 0 kg/cm² when the temperature reaches the point T is that fusing and fractures, etc. are apt to be caused if the pressure is rapidly reduced when the point T is reached. That is, when the pressure applied to the patterned portion is rapidly reduced in the vicinity of the transition point or at a temperature higher than the transition point so that hardly any pressure is applied to the patterned portion, the patterned portion of the molded glass element which has not been completely set remains adherent to the spacing between the patterns of the mold and this is apt to cause fusing and cracking, etc. When mold release is performed immediately after pressing, that is, immediately before the cooling process, since the fluidity of the glass is high, the pattern configuration of the mold is not precisely transferred. When the cooling speed is less than 20° C./minute, cooling takes an excessively long time, so that the molding cycle increases. As a result, the cost increases. When the cooling speed exceeds 40° C./minute, a press pressure distribution difference is apt to result, increasing internal distortion, so that a change in configuration and fractures can result. In order to maintain high transfer precision while preventing fusing, chips and fractures, the above-mentioned pressurizing conditions are adopted.

After the first cooling process is finished, that is, after the temperature reaches the point T and the pressure becomes 0 kg/cm², a pressurization control mechanism of the upper mold is driven to move the upper mold slightly upward and a second cooling (second cooling process) is performed with this state being maintained. The pressure applied to the glass is controlled so as to be 0 kg/cm² at the temperature point T and the patterns of the mold and the molded glass element are not in contact with each other for the following reasons: Glass exhibits a viscoelastic property when its temperature is not less than the transition point, and can flow as the mold shrinks. However, when the temperature becomes lower than the transition point, the viscoelastic property is lost, so that fractures and chips are apt to result. Particularly, at the patterned portion, the glass flowing into the spacing between the patterns cannot follow the shrinkage of the upper mold, so that chips and fractures result. Further, by reducing the pressure applied to the mold so as to be 0 kg/cm² when the cooling proceeds to the vicinity of the point T, the mold having a low thermal expansion is pushed out along the inclined surface and a side surface of the patterned portion by convex portions of the patterned portion of the glass having a high thermal expansion coefficient and a high shrinking speed, so that the mold is easily separated from the glass. Consequently, when the pressure is reduced to substantially 0 kg/cm², the ends of the pattern convex portions of the molded glass element and the mold barely overlap or contact each other, so that the mold can be raised with hardly any stress being applied to the surface of the molded glass.

Moreover, it is desirable that the position to which the upper mold is moved be a position where the patterns of the glass and the mold do not overlap or contact each other, that is, it is desirable that the upper mold be raised by a distance which is not less than the depth of the patterns. In actuality, it is preferable to raise the mold until a reference surface of the mold becomes 1 to 200 μm away from a reference surface of the molded glass element. This is done in order that the heat of the mold is indirectly transmitted to the molded glass element. At this distance, the cooling speed of the molded glass element can be controlled by controlling the cooling speed of the mold. In the second cooling process, since the fluidity is sufficiently reduced as mentioned above, the cooling speed may be higher than that in the first cooling speed.

After the second cooling process is finished, the upper mold is further raised and the molded glass element is taken out to finish the molding procedure according to the method of a glass element of the present invention.

Visually evaluating the obtained molded glass element, it was found that the patterns were transferred with high precision and hardly any fusing, chips or fractures were visible. As a result of evaluating the configuration of the transferred patterns with Surfcom (manufactured by Tokyo Seimitsu Co., Ltd.) which is a commercially available surface texture measuring instrument employing the tracer method, with respect to the spacing between the patterns, the deviation from the pattern design value fell within a range of ±0.5 μm. Further, molding was repeated several shots by use of a similar process. Evaluating the molded lenses, it was found that the configuration of the mold was transferred to the entire surface of the effective transfer diameter and the deviation fell within a range of ±0.1 μm.

It is obvious that the above-described molding method of a glass element of the present invention effectively delivers the effects of the present invention even when the molded glass element has no patterns.

The method of the present invention will be described in more detail with reference to concrete experimental examples described below.

FIRST EXPERIMENTAL EXAMPLE

Figure 2:
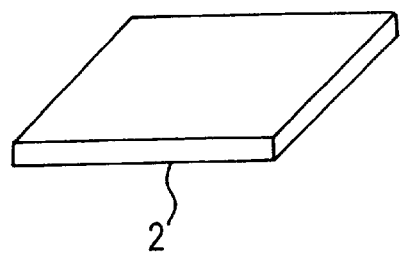
FIG. 2 is a perspective view showing a preform molded in the first embodiment.

The configuration of a preform 2 used in this experimental example is shown in FIG. 2. To form the preform 2, a base plate of BK7 glass with a thickness of 4 mm (thermal expansion coefficient, $91 \times 10^{-7}$/° C.; transition point, 557° C.) was cut and ground to a predetermined thickness. FIG. 3(b) is a schematic cross-sectional view showing the mold structure of a molding machine. The mold of the molding machine used in this experimental example was made of a superhard alloy (thermal expansion coefficient, $55 \times 10^{-7}$/° C.) and comprised a pair of upper and lower molds 3 and 4. On a surface of the upper mold 3 which came into contact with the preform, patterns with a peak-to-peak spacing of 250 μm, a length of 20 mm and a depth of 180 μm were formed over a width of 12 mm (see FIG. 3(a)). At the lowest end portion on the outer surface of the upper mold 3, the inclined surface 5 ($\theta=30°$) was formed (see FIG. 3(b)). The cross-sectional configuration of the peaks of the patterns was triangular (V-shaped) as shown in FIG. 3(b).

First, the preform 2 was conveyed to a space between the upper and lower molds 3 and 4 of a known molding machine (not shown) and heated between the molds to a molding temperature (in the vicinity of 650° C.). After the temperature of the preform reached the molding temperature, the distance between the upper and lower molds 3 and 4 was reduced and a pressure of approximately 16 kg/cm² was applied to the molds to start press molding. The press molding was continued for approximately 2.5 minutes with the temperature of the preform 2 being maintained at the molding temperature (see FIG. 3(c)).

After the press molding was finished, cooling of a molded patterned element 1 was started. In the first cooling process, the patterned element 1 was cooled at a speed of 25° C./minute. The cooling was continued for four minutes until the point T (550° C.) was reached where the temperature of the patterned element 1 was in the vicinity of the transition point. At this time, the pressure applied to the patterned element 1 was reduced at a speed of 4 kg/cm²/minute from a pressure of approximately 16 kg/cm²/minute applied at the time of molding so that the pressure was substantially 0 kg/cm² at the point T.

When the point T was reached, the upper mold 3 was raised until the patterns no longer contacted each other, that is, until a reference surface of the upper mold 3 became 180 μm away from a reference surface of the patterned element 1. Then, in the second cooling process below the point T, cooling was performed for five minutes at a speed of 80° C./minute with this state being maintained.

After the second cooling was finished, the upper mold 3 was further raised and the molded patterned element 1 was taken out (see FIG. 1). Visually evaluating the quality, hardly any fusing, chips or fractures were visible and the patterned element 1 had a pattern 6 corresponding to the patterned portion of the upper mold, and a counterbore 7 corresponding to the inclined surface 5. As a result of evaluating the configuration of the transferred pattern 6 with Surfcom (manufactured by Tokyo Seimitsu Co., Ltd.) which is a commercially available surface texture measuring instrument employing the tracer method, the deviation of the peak-to-peak spacing from the pattern design value, 250 μm, of the upper mold 3 fell within a range of ±0.5 μm.

Figure 4:
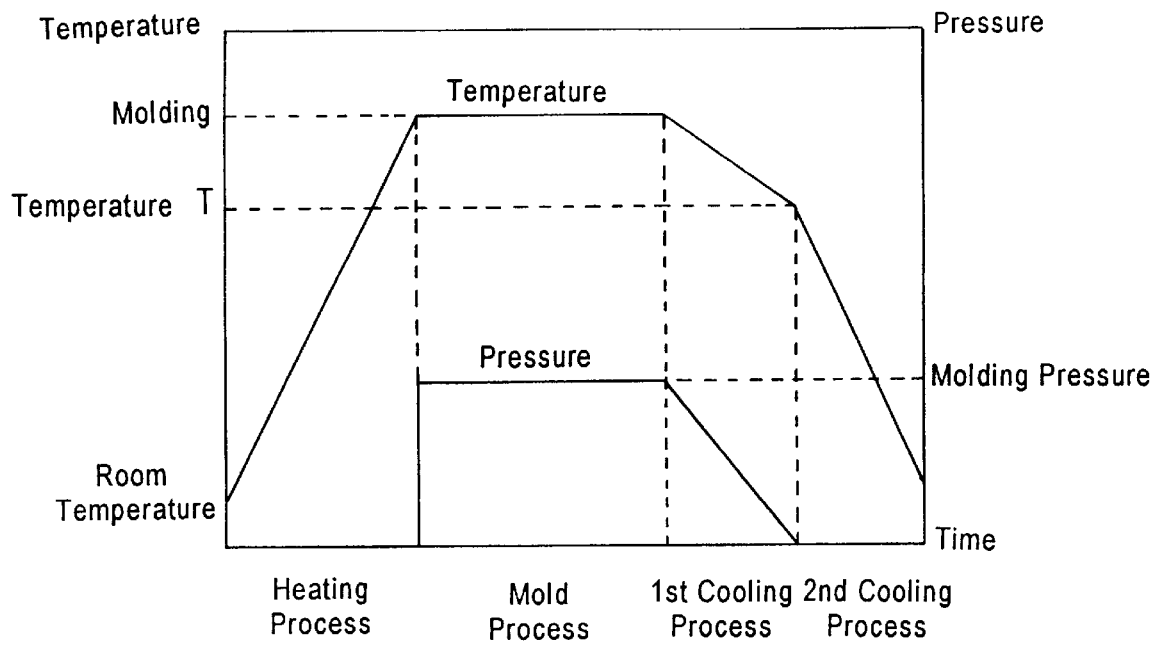
FIG. 4 is a with-time schematic view showing molding conditions for molding of a glass element in the first embodiment.

Molding was repeated twenty shots using a similar process. Evaluating the molded lenses, patterned elements were obtained in which the configuration of the mold was transferred to the entire surface of the effective transfer diameter and the deviation fell within a range of ±0.5 μm. Variation in temperature of the mold and variation in pressure applied to the mold are shown in FIG. 4 as a with-time schematic view.

SECOND EXPERIMENTAL EXAMPLE

Figure 6:
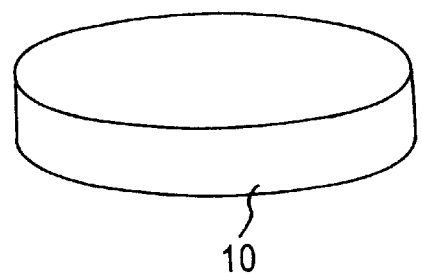
FIG. 6 is a perspective view of a preform used in the second embodiment.

In this experimental example, a preform 10 was used. The configuration of the preform 10 is shown in FIG. 6. To form the preform 10, a high-melting glass (LaF71) with a thickness of 1 mm and a diameter of 20 mm (thermal expansion coefficient, $67 \times 10^{-7}/° C$.; transition point 632° C.) was melted in a furnace, was dripped from a nozzle provided at the bottom surface of the furnace and the dripped glass was caught in the mold. In this embodiment, stainless steel (thermal expansion coefficient, $180 \times 10^{-7}/° C$.) was selected as the material for the upper and lower molds of the molding machine. As shown in FIGS. 7(a)(1) and 7(b)(1), the upper mold comprised the core 23 where the patterned surface was formed and the outer mold 225 was cylindrical and made of carbon having a higher thermal expansion coefficient than glass. At the lowest end portion on the inner surface of the outer mold 225, the inclined surface (θ=15° C.) was formed. As for the surface of the core 23, stainless steel was planished, the planished surface was coated with a patterned layer made of chromium, and a concentrically patterned surface 220 was formed thereon. The lower mold 24, as shown in FIGS. 7(a)(2) and 7(b)(2), was formed to have a plane. The depth of the pattern 220 at the core 23 was 0.6 μm, the grating spacing was 12.6 μm at a position 0.5 mm away from the center along the radius, and 0.97 μm at a position 8.0 mm away.

In this experimental example, four pairs of upper and lower molds were prepared to form a so-called multi-cavity mold. The molds were fixedly held by an upper barrel mold 223, a lower barrel mold 224 and back plates 233 and 234. The core 23 was engaged in the outer mold 225 and attached to the barrel mold under the engaged state. The barrel molds were made of stainless steel and the back plates were made of heat-resistant ceramic.

First, the preform 10 was conveyed to a space between the core 23 and the lower mold 24 held by the pair of barrel molds 223 and 224 attached to a known molding machine (not shown) and heated between the molds to a molding temperature (in the vicinity of 700° C.). After the temperature of the preform 10 reached the molding temperature, the distance between the core 23 and the lower mold 24 was reduced and a pressure of approximately 25 kg/cm² was applied to the molds to start press molding. The press molding was continued for 6 minutes with the temperature of the preform 10 being maintained at the molding temperature (see FIG. 7(c)).

After the press molding was finished, cooling of a molded patterned element 21 was started. In the first cooling process, the patterned element 21 was cooled at a speed of 25° C./minute. The cooling was continued for four minutes until the point T (650° C.) was reached where the temperature of the patterned element 21 was in the vicinity of the transition point. At this time, the pressure applied to the patterned element 21 was reduced at a speed of 5 kg/cm²/minute from a pressure of approximately 25 kg/cm²/minute applied at the time of molding so that the pressure was substantially 0 kg/cm² at the point T. When the point T was reached, the core 23 was raised until the patterns of the mold and the glass no longer contacted each other, that is, until a reference surface of the core 23 was approximately 1 μm away from a reference surface of the patterned element 21. Under this state, the second cooling process was started and cooling was performed for five minutes at a speed of 80° C./minute.

Figure 5A:
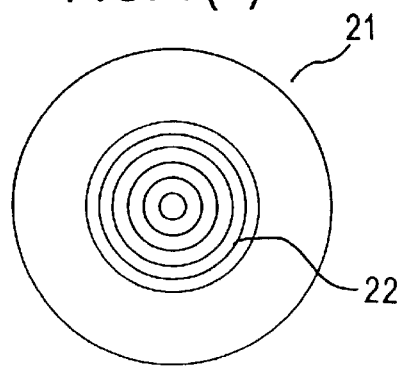
FIG. 5 is a schematic top view and a schematic cross-sectional view of a molded glass element formed in a second embodiment.
Figure 5B:
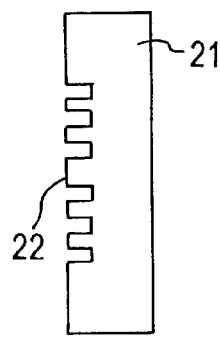

After the second cooling was finished, the core 23 was further raised and the molded patterned element 21 (see FIG. 5) was taken out. Visually evaluating the quality, hardly any fusing, chips or fractures were visible and the patterned element 21 had a pattern 22 corresponding to the patterned portion of the upper mold. As a result of evaluating the configuration of the transferred pattern with Surfcom (manufactured by Tokyo Seimitsu Co., Ltd.) which is a commercially available surface texture measuring instrument employing the tracer method, the deviation of the configuration of the pattern 22 from the design value of the pattern 220 of the core 23 fell within a range of ±0.5 μm.

Molding was repeated fifty shots using a similar process. Evaluating the molded diffraction gratings, a concentric pattern was obtained in which the configuration of the mold was transferred to the entire surface of the effective transfer diameter and the deviation fell within a range of ±0.5 μm. Variation in temperature of the mold and variation in pressure applied to the mold were the same as those shown in FIG. 4 as the with-time schematic view.

THIRD EXPERIMENTAL EXAMPLE

Figure 8:
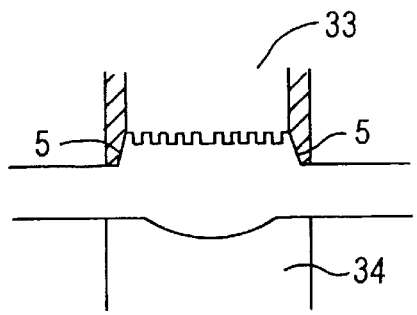
FIG. 8 is a schematic cross-sectional structure view of upper and lower molds used in a third embodiment.

The structure of upper and lower molds 33 and 34 according to this experimental example is shown in FIG. 8. This experimental example used the lower mold 34 having on its one surface a convex aspherical surface with an approximate curvature of 90 mm, and an upper mold 35 (θ=15°) where a concentric pattern similar to that of the second experimental example 2 was formed. As the mold material, aluminum oxide (thermal expansion coefficient, $82 \times 10^{-7}/° C$.) was used. The aluminum oxide was coated with a patterned layer made of chromium and the concentric pattern was formed thereon. Other structures were similar to those of the second experimental example. In this example, a preform was used which is made of LaF71 of a plane form with a thickness of 3 mm and a diameter of 12 mm.

Molding was performed under similar conditions as in the second experimental example. Visually evaluating the quality, hardly any fusing, chips or fractures were recognized and the molded lens diffraction grating had a pattern corresponding to the patterned portion of the upper mold. Molding was repeated thirty shots in a similar manner. As a result of evaluating the molded lens diffraction gratings with a surface texture measuring instrument similar to that used in the above-described embodiments, the configuration of the mold was precisely transferred to the surfaces of all the molded lens diffraction gratings, the molded lens diffraction gratings had optical performance of not less than ½λ at a reflecting wave front in the measurement, and hardly any fusing, etc. was noted. Variation in temperature of the mold and variation in pressure applied to the mold in the above-described molding process were similar to those shown in FIG. 4 as the with-time schematic view. The cooling speed and the pressure reduction speed in the first cooling process were 25° C./minute and 5 kg/cm²/minute, respectively. The cooling speed in the second cooling process was 80° C./minute.

FIRST COMPARATIVE EXPERIMENTAL EXAMPLE

Figure 9:
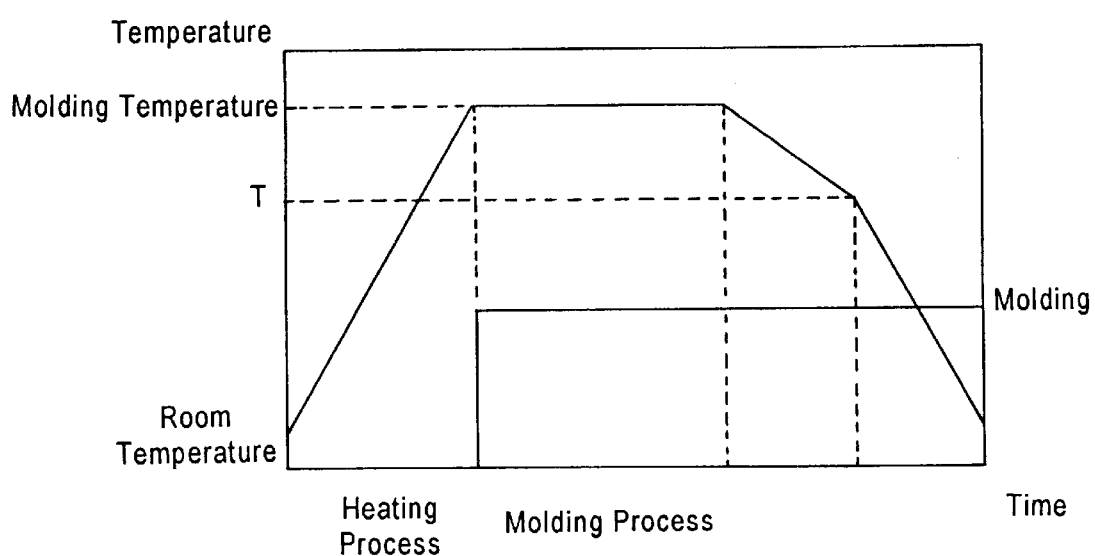
FIG. 9 is a with-time schematic view showing molding conditions of a first comparative example.

Using the molding machine (including upper and lower molds) used in the first experimental example, a preform made of LaF71 was molded by continuing pressurization until cooling was finished as shown in FIG. 9. That is, the preform was heated to a molding temperature of 750° C. and pressure-molded at 25 kg/cm². Then, with the pressurization continuing, the preform was cooled by pressurization under a condition where it was in contact with the mold, and mold release was performed. As a result, chips and fractures which could be visually recognized resulted at the patterned portion of the molded element, and pieces of fused glass adhered to the spacing between the patterns of the mold. The cooling speed was 25° C./minute until the mold temperature became the point T, and was 80° C./minute after the mold temperature became lower than the point T.

Molding was repeated fifty shots. Although the number of times of molding was smaller than in the above-described experimental examples, almost all of the molded elements were defective. In particular, fusing was conspicuous in many elements. It is considered that fusing was caused since cooling was continued until immediately before the mold release with the mold and preform being in contact with each other.

SECOND COMPARATIVE EXPERIMENTAL EXAMPLE

Figure 10:
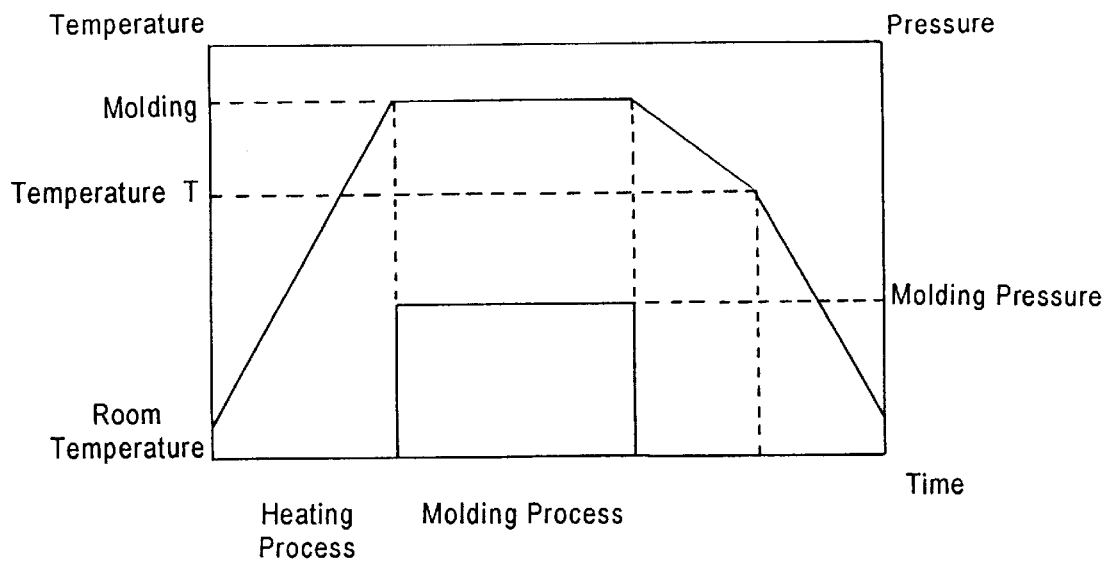
FIG. 10 is a with-time schematic view showing molding conditions of a second comparative example.
Figure 11A:
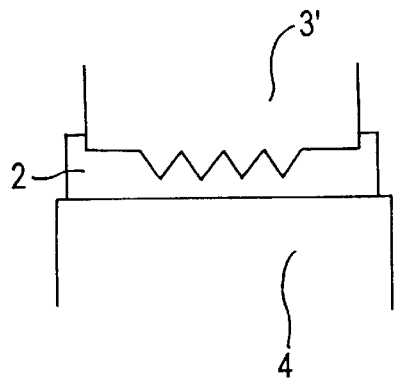
FIGS. 11(a) and 11(b) are schematic views showing the configuration of a conventional upper mold.
Figure 11B:
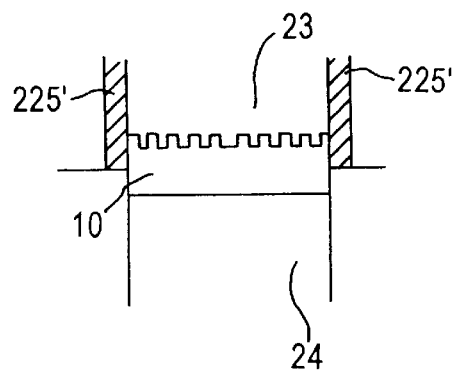

A patterned element was molded by a molding process as shown in FIG. 10, that is, in a similar manner to that of the first comparative experimental example except that after press molding was finished, the mold was immediately raised and cooling was performed without the mold and the preform being in contact with each other. The configuration of the V-grooved patterns was not precisely transferred and the angles of the V grooves were non-uniform. Further, the apexes of the V grooves became rounded. Thus, none of the molded elements was suitable for use. The cooling speed was 25° C./minute until the mold temperature became the point T, and was 80° C./minute after the mold temperature became lower than the point T.

THIRD COMPARATIVE EXPERIMENTAL EXAMPLE

Using the molding machine used in the first experimental example and an upper mold having no inclined surface at its outer surface, a preform made of LaF71 was molded under similar conditions to those of the first embodiment. Chips and fractures which could be visually recognized resulted at the patterned portion of the molded element and pieces of fused glass adhered to the spacing between the patterns of the mold.

As described above, according to the method described in the experimental examples, the patterns of the mold are precisely transferred to the molded glass element without any problems of fusing between the glass material and the mold, chips or fractures.

There accordingly has been described a method of forming, by press molding, patterned elements such as lenses, prisms and gratings, namely, substrates and optical elements having on their surfaces extremely fine patterns in which there is no fusing between the glass material and the press molds, and in which chips, fractures and cracks in the patterned elements do not result.

The many features and advantages of the invention are apparent from the detailed specification, and thus, it is intended by the appended claims to cover all such features and advantages of the invention which fall within the true spirit and scope of the invention. Since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. A molding method of a glass element comprising:

heating a glass material;

press-molding the glass material between an upper mold and a lower mold when a temperature of the heated glass material reaches a predetermined temperature to form said glass element, at least said upper mold having a patterned surface for forming a patterned surface on said glass element;

cooling the glass element while in contact with the upper and lower molds until a temperature of said glass element is within a range of ±20° C. of a glass transition point of the glass material while gradually reducing a pressure applied to said glass element by said upper and lower molds at a rate of 3 to 30 kg/cm²/minute until said pressure becomes 0 kg/cm²; and subsequently cooling said glass element with said upper mold separated from said patterned surface on said glass element by a distance which is not less than the depth of the pattern.

2. The molding method according to claim 1, wherein a separation of said upper mold from said glass element during the subsequent cooling of said glass element is from 1 to 200 μm.

3. The molding method according to claim 1, wherein the pressure applied by said pair of molds is between 15 to 60 kg/cm² during press molding, and the cooling of the glass element while in contact with said pair of molds is at a speed of 20 to 40° C./minute.

4. The molding method according to claim 3, wherein the pressure applied by said pair of molds is continued for 3 to 10 minutes with the temperature of the heated glass material maintained at the predetermined temperature.

5. The molding method according to claim 3, wherein the cooling of the glass element while in contact with said pair of molds is continued for 2 to 5 minutes.

6. The molding method according to claim 3, wherein pressure applied to said glass element is reduced at a speed of 3 to 10 kg/cm² /minute.

7. The molding method according to claim 1, wherein cooling the glass element while in contact with the pair of molds is performed until a temperature of said glass element is within a range of ±10° C. of a glass transition point of the glass material.

8. The molding method according to claim 1, wherein said patterned surface is contained on a bottom surface of said upper mold, said upper mold further having a sidewall surface with a lowermost end portion of the sidewall surface being adjacent to the bottom surface, and the step of press molding presses said bottom surface against the glass element.

9. The molding method according to claim 8, wherein said lowermost end portion of the sidewall surface is inclined with respect to the central axis of said upper mold at an angle not less than 3°.

10. The molding method according to claim 9, wherein said lowermost end portion of the sidewall surface is inclined with respect to the central axis of said upper mold at an angle from 10 to 60°.

11. The molding method according to claim 1, wherein said patterned surface is contained in a core in said upper mold, said upper mold further having a cylindrical outer mold having an innermost surface with a lower most end portion of the inner most surface being inclined with respect to a central axis of said upper mold, and the step of press molding presses said core against the glass element.

12. The molding method according to claim 11, wherein said lowermost end portion of the inner surface is inclined with respect to the central axis of said upper mold at an angle not less than 3°.

13. The molding method according to claim 12, wherein said lowermost end portion of the inner surface is inclined with respect to the central axis of said upper mold at an angle from 10 to 60°.

* * * * *